United States Patent
Miura

(10) Patent No.: US 7,409,821 B2
(45) Date of Patent: Aug. 12, 2008

(54) CATALYTIC CONVERTER DEGRADATION DETERMINING SYSTEM

(75) Inventor: Manabu Miura, Zushi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/288,233

(22) Filed: Nov. 29, 2005

(65) Prior Publication Data

US 2006/0123768 A1 Jun. 15, 2006

(30) Foreign Application Priority Data

Dec. 14, 2004 (JP) ............................. 2004-361094

(51) Int. Cl.
*F01N 3/00* (2006.01)

(52) U.S. Cl. .............................. 60/277; 60/274; 60/285; 60/297; 60/301

(58) Field of Classification Search ................... 60/274, 60/277, 284, 285, 297, 301, 276
See application file for complete search history.

(56) References Cited

U.S. PATENT DOCUMENTS

| | | | | |
|---|---|---|---|---|
| 5,447,696 A | * | 9/1995 | Harada | 422/174 |
| 5,948,974 A | * | 9/1999 | Mitsutani | 73/118.1 |
| 6,295,807 B1 | * | 10/2001 | Douta et al. | 60/274 |
| 6,401,450 B1 | * | 6/2002 | Hoshi | 60/277 |
| 6,651,422 B1 | * | 11/2003 | LeGare | 60/277 |
| 6,761,023 B1 | * | 7/2004 | Schnaibel et al. | 60/277 |
| 7,114,328 B2 | * | 10/2006 | Nagaoka et al. | 60/285 |
| 2001/0054282 A1 | | 12/2001 | Lang et al. | |

FOREIGN PATENT DOCUMENTS

| | | |
|---|---|---|
| FR | 2833994 A | 6/2003 |
| JP | 2-30915 A | 2/1990 |
| WO | WO-2004/022953 A | 3/2004 |

\* cited by examiner

*Primary Examiner*—Binh Q Tran
(74) *Attorney, Agent, or Firm*—Global IP Counselors, LLP

(57) ABSTRACT

A catalytic converter degradation determining system is configured to accurately determine if a NOx trapping catalytic converter is degraded. The system is configured to detect or estimate the temperature of a NOx trapping catalytic converter and sets a pre-degradation adsorption efficiency and a post-degradation adsorption efficiency based on the catalytic converter temperature. The system then multiplies the adsorption efficiencies by an exhaust gas NOx quantity to calculate trapped NOx rates. The individual trapping NOx rates are summed over a prescribed amount of time to estimate the pre-degradation and post-degradation NOx trapping amounts. After the prescribed amount of time elapses, the system compares the pre-degradation NOx trapping amount to the post-degradation NOx trapping amount and determines if the difference between the two is smaller than a prescribed value. If the difference is smaller than the prescribed value, then the system determines that the catalytic converter is degraded.

8 Claims, 3 Drawing Sheets

CATALYTIC CONVERTER DEGRADATION DETERMINING SYSTEM

CROSS-REFERENCE TO RELATED APPLICATIONS

This application claims priority under 35 U.S.C. § 119 to Japanese Patent Application No. 2004-361094. The entire disclosure of Japanese Patent Application No. 2004-361094 is hereby incorporated herein by reference.

BACKGROUND OF THE INVENTION

1. Field of the Invention

The present invention generally relates to a degradation determining system for an exhaust gas cleaning catalytic converter configured to be arranged in an exhaust passage of an internal combustion engine and having at least an oxidizing function (includes NOx trapping catalytic converters).

2. Background Information

One example of a known catalytic converter degradation determining system is the system disclosed in Japanese Laid-Open Patent Publication No. 02-030915. That system (dual $O_2$ sensor system) has two air-fuel ratio sensors ($O_2$ sensors), one arranged upstream of the catalytic converter and another arranged downstream of the catalytic converter. This catalytic converter degradation determining system is configured to determine if the catalytic converter is degraded based on signals from the air-fuel ratio sensors.

In view of the above, it will be apparent to those skilled in the art from this disclosure that there exists a need for an improved degradation determining system. This invention addresses this need in the art as well as other needs, which will become apparent to those skilled in the art from this disclosure.

SUMMARY OF THE INVENTION

It has been discovered that in such dual $O_2$ sensor systems, the engine is required to be operated with a stoichiometric air-fuel mixture and, thus, are widely used in gasoline engines. However, dual $O_2$ sensor systems are not able to determine the degradation of the catalytic converter in diesel engines and other engines that are normally run lean (i.e., with a lean air-fuel mixture).

The present invention was conceived in view of this shortfall. One object of the present invention is to provide a catalytic converter degradation determining system that can determine if a catalytic converter is degraded even under lean engine operating conditions.

The present invention offers a catalytic converter degradation determining system configured to determine if a catalytic converter having at least an oxidizing function is degraded, the degradation determination being accomplished by detecting or estimating the heat of reaction of the oxidation induced by the catalytic converter or a value equivalent to the heat of reaction and determining if the catalytic converter is degraded based on a decline in the heat of reaction or the value equivalent to the heat of reaction.

More particularly, the present invention also offers a catalytic converter degradation determining system for a NOx trapping catalytic converter configured to trap NOx in the exhaust gas when the internal combustion engine is running on a lean air-fuel mixture and clean and release the trapped NOx when the internal combustion engine is running on a stoichiometric air-fuel mixture or a rich air-fuel mixture.

In accordance with one aspect of the present invention, the catalytic converter degradation determining system of the present invention basically comprises a temperature detecting section, a pre-degradation NOx adsorption efficiency establishing section, pre-degradation trapped NOx estimating section, a post-degradation NOx adsorption efficiency establishing section, a post-degradation trapped NOx estimating section, and a degradation determining section. The temperature detecting section is configured to detect a temperature of a catalytic converter that traps NOx in exhaust gas when a lean air-fuel mixture is used for combustion and that cleans and releases trapped NOx when a stoichiometric air-fuel mixture or a rich air-fuel mixture is used for combustion. The pre-degradation NOx adsorption efficiency establishing section is configured to establish a pre-degradation NOx adsorption efficiency of the catalytic converter corresponding to conditions under which the catalytic converter is new based on the temperature of the catalytic converter. The pre-degradation trapped NOx estimating section is configured to estimate a pre-degradation NOx trapping amount using the pre-degradation NOx adsorption efficiency. The post-degradation NOx adsorption efficiency establishing section is configured to establish a post-degradation NOx adsorption efficiency of the catalytic converter corresponding to conditions under which the catalytic converter is degraded based on the temperature of the catalytic converter. The post-degradation trapped NOx estimating section is configured to estimate a post-degradation NOx trapping amount using the post-degradation NOx adsorption efficiency. The degradation determining section is configured to determine that the catalytic converter is degraded when a difference between the pre-degradation NOx trapping amount and the post-degradation NOx trapping amount is below a prescribed value.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
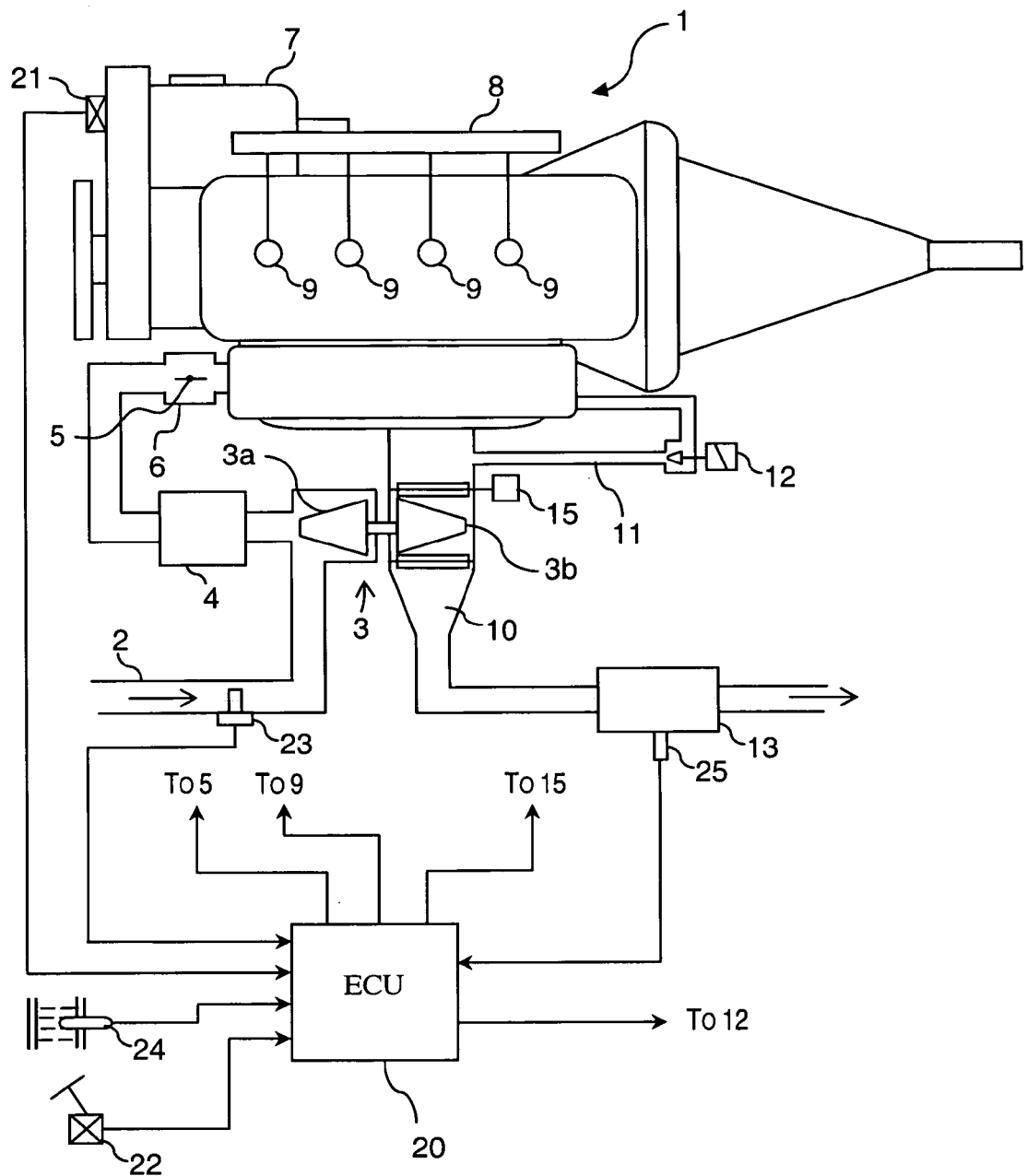
FIG. 1 is a simplified block diagram of an internal combustion engine (e.g., a diesel engine) in accordance with an embodiment of the present invention.

Referring initially to FIG. 1, a schematic diagram of a direct injection diesel engine 1 is illustrated in accordance with a first embodiment of the present invention. The diesel engine 1 is preferable used in an automobile. The diesel engine 1 is well known in the art. Since diesel engines are well known in the art, the precise structure of the diesel engine 1 will not be discussed or illustrated in detail herein. An air cleaner (not shown) is installed at an inlet part of an air intake passage 2 to remove dust and particles from intake air to the diesel engine 1. A variable nozzle turbocharger 3 is operatively coupled to diesel engine 1.

The turbocharger 3 includes a compressor part 3a installed in the air intake passage 2 downstream of the air cleaner and a turbine part 3b installed in an exhaust passage 10. The intake air that has passed through the air cleaner is compressed by the compressor part 3a and fed onward to an intercooler 4. The intercooler 4 is installed downstream of the compressor part 3a such that the intake air discharged from the compressor part 3a is cooled by the intercooler 4. A throttle valve 5 is installed immediately upstream of a surge tank or collector 6. Thus, the cooled intake air from the intercooler 4 passes through the throttle valve 5 and into the collector 6 before being distributed to the individual cylinders at a manifold section of the diesel engine 1.

The fuel is delivered to the combustion chambers using a common rail fuel injection system. More specifically, the fuel is pressurized to a high pressure with a high pressure fuel pump 7. The fuel is then delivered to a common rail 8, and injected directly into the combustion chambers of the respective cylinders by a plurality of fuel injection valves or fuel injectors 9. The intake air and injected fuel undergo compression ignition (in this embodiment) inside the combustion chamber and the resulting exhaust gas is discharged to the exhaust passage 10.

Meanwhile, a portion of the exhaust gas flowing into the exhaust passage 10 is recirculated to the air intake side as EGR gas by an EGR system, i.e., by an EGR passage 11 and an EGR valve 12. The turbine part 3b of the turbocharger 3 is installed downstream of the manifold section in the exhaust passage 10. Thus, the remaining exhaust gas serves to drive the exhaust turbine part 3b of the turbocharger 3.

A NOx trapping catalytic converter 13 comprising a three-way catalytic converter with an added NOx adsorbing substance is provided in the exhaust passage 10 downstream of the exhaust turbine for the purpose of cleaning the exhaust gas. The NOx trapping catalytic converter 13 is configured to trap NOx contained in the exhaust gas when the air-fuel ratio of the exhaust gas is lean. The NOx trapping catalytic converter 13 is configured to clean and release the trapped NOx when the air-fuel ratio of the exhaust gas is stoichiometric or rich. More specifically, this NOx trapping catalytic converter 13 is configured to oxidize NO in the presence of platinum or other precious metal when the air-fuel ratio is lean so that NOx can be more easily adsorbed and stored by the adsorbing substance in the form of $NO_2$. Meanwhile, when the air-fuel ratio is stoichiometric or rich, the $NO_2$ is reacted in a reduction reaction with HC, CO, etc., to obtain N2.

In order to control the engine 1, an engine control unit or "ECU" 20 receives various input or control signals from various sensors, including, but not limited to, a rotational speed sensor 21, an accelerator position sensor 22, an air flow meter 23, a coolant sensor 24 and a catalytic converter temperature sensor 25. The rotational speed sensor 21 is configured and arranged to detect an engine rotational speed Ne and to produce a signal indicative of the engine rotational speed Ne. The accelerator position sensor 22 is configured and arranged to detect the accelerator position APO and to produce a signal indicative of the accelerator position APO. The air flow meter 23 is configured and arranged to detect the intake air quantity Qa and to produce a signal indicative of the intake air quantity Qa. The coolant sensor 24 is configured and arranged to detect the temperature Tw of the engine coolant and to produce a signal indicative of the temperature Tw of the engine coolant. The catalytic converter temperature sensor 25 is provided to detect the catalytic converter temperature (carrier temperature) Tcat of the NOx trapping catalytic converter 13 and to produce a signal indicative of the catalytic converter temperature Tcat. These signals are all fed to the engine control unit 20. It is also acceptable to provide an exhaust gas temperature sensor downstream of the NOx trapping catalytic converter 13 and detect the catalytic converter temperature Tcat indirectly based on the exhaust gas temperature.

Based on the aforementioned input signals, the engine control unit 20 issues fuel injection command signals to the fuel injectors 9 for controlling the fuel injection quantity and fuel injection timing of the fuel injections executed by the fuel injectors 9, an opening degree command signal to the intake air throttle valve 5, an opening degree command signal to the EGR valve, and a nozzle opening degree command value to a variable nozzle mechanism 15 of the supercharger 3.

The engine control unit 20 preferably includes a microcomputer with a NOx trapping catalytic converter degradation determining program that determines the fuel degradation of the NOx trapping catalytic converter 13. The engine control unit 20 can also include other conventional components such as an input interface circuit, an output interface circuit, and storage devices such as a ROM (Read Only Memory) device and a RAM (Random Access Memory) device. The memory circuit stores processing results and control programs are run by the processor circuit. The engine control unit 20 is operatively coupled to the sensors 21 to 25 in a conventional manner. The internal RAM of the engine control unit 20 stores statuses of operational flags and various control data. The internal ROM of the engine control unit 20 stores various operations as needed and/or desired. It will be apparent to those skilled in the art from this disclosure that the precise structure and algorithms for the engine control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In this embodiment, the engine control unit 20 performs the degradation determination to determine if the NOx trapping catalytic converter 13 is degraded. The degradation determination will now be described in detail.

Figure 2:
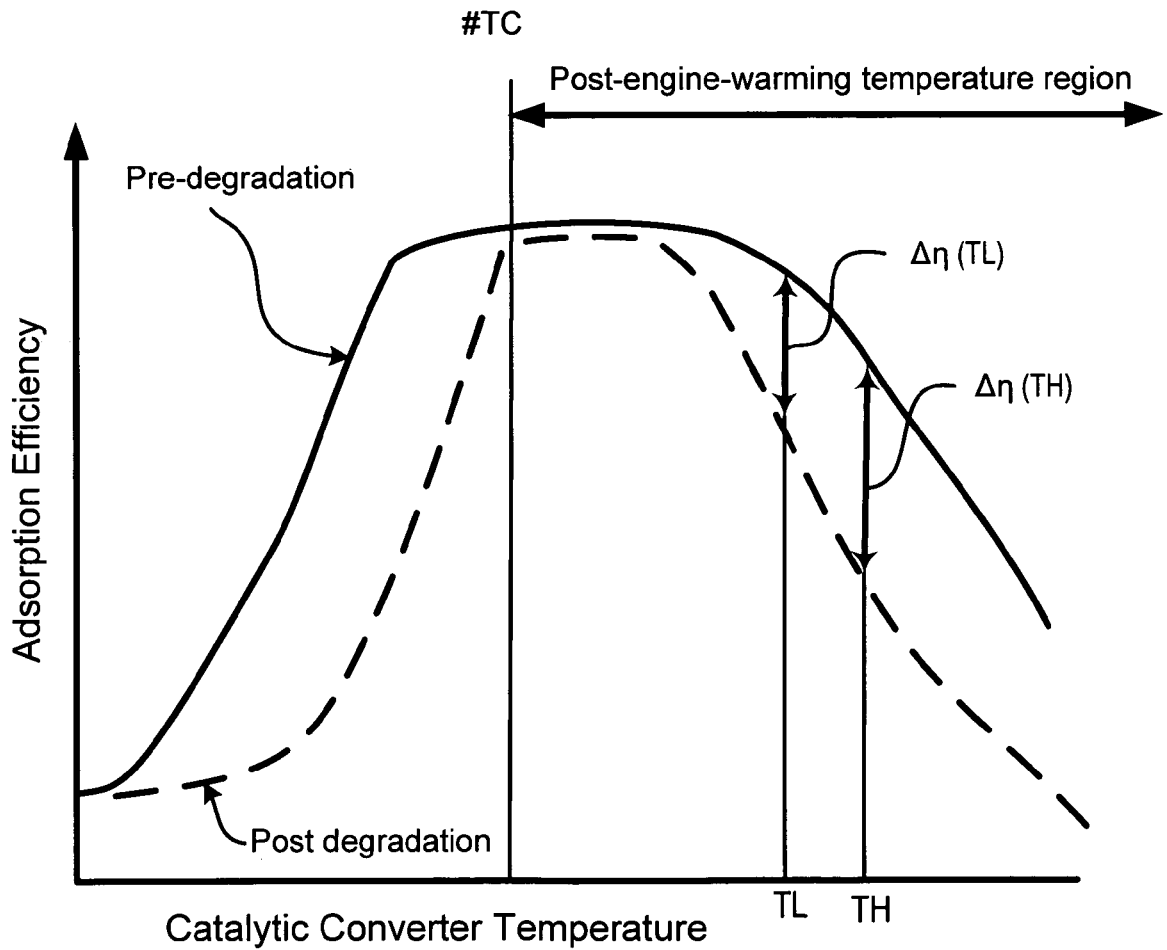
FIG. 2 is a diagram showing the relationship between the temperature and adsorption efficiency of a NOx trapping catalytic converter for both pre-degradation conditions and degraded (post-degradation) conditions.

FIG. 2 shows the relationship between the temperature and adsorption efficiency of a NOx trapping catalytic converter for both new conditions ("before degradation" or "pre-degradation") and degraded conditions ("after degradation" or "post-degradation").

In the post-engine-warming temperature region (catalytic converter temperatures TC and higher), the adsorption efficiency decreases as the catalytic converter temperature increases. This trend is exhibited both before and after degradation. Conversely, the adsorption efficiency increases as the catalytic converter temperature decreases. Also, the temperature at which the adsorption efficiency starts to decline in the region is lower after degradation than before degradation such that the degree of decline in the adsorption efficiency is more severe after degradation than before degradation.

Thus, a comparison of the difference $\Delta\eta(TH)$ between the pre-degradation and post-degradation adsorption efficiencies at a certain higher catalytic converter temperature TH and the difference $\Delta\eta(TL)$ between the pre-degradation and post-degradation adsorption efficiencies at a certain lower catalytic converter temperature TC reveals that $\Delta\eta(TH) > \Delta\eta(TC)$.

Meanwhile, when the NOx trapping catalytic converter 13 degrades, it can no longer induce a sufficient oxidation reaction (i.e., the oxidation reaction NO→NO$_2$, which is used for adsorption) and the temperature of the catalytic converter 13 declines because the heat of reaction resulting from oxidation declines. Consequently, as the NOx trapping catalytic converter 13 degrades, the difference between the pre-degradation adsorption efficiency and the post-degradation efficiency decreases (e.g., $\Delta\eta(TH) \rightarrow \Delta\eta(TC)$).

This embodiment utilizes the fact that a catalytic converter degrades over time such that, as it ages, it becomes unable to induce a sufficient oxidation reaction. The degradation of the catalytic converter 13 is determined based on a decrease in the heat of reaction of the oxidation reaction or a decrease in the catalytic converter temperature, which is a value equivalent to the heat of reaction of the oxidation reaction. More specifically, in this embodiment, an amount of trapped NOx is estimated based on the pre-degradation adsorption efficiency corresponding to the catalytic converter temperature and another amount of trapped NOx is estimated based on the post-degradation adsorption efficiency corresponding to the catalytic converter temperature. The difference between the two amounts of trapped NOx is calculated and compared to a prescribed value. If the difference is smaller than the prescribed value, then the system determines that a decrease in the heat of reaction of the oxidation reaction induced by the catalyst has caused the catalytic converter temperature to decrease and, thus the NOx trapping catalytic converter is degraded.

Figure 3:
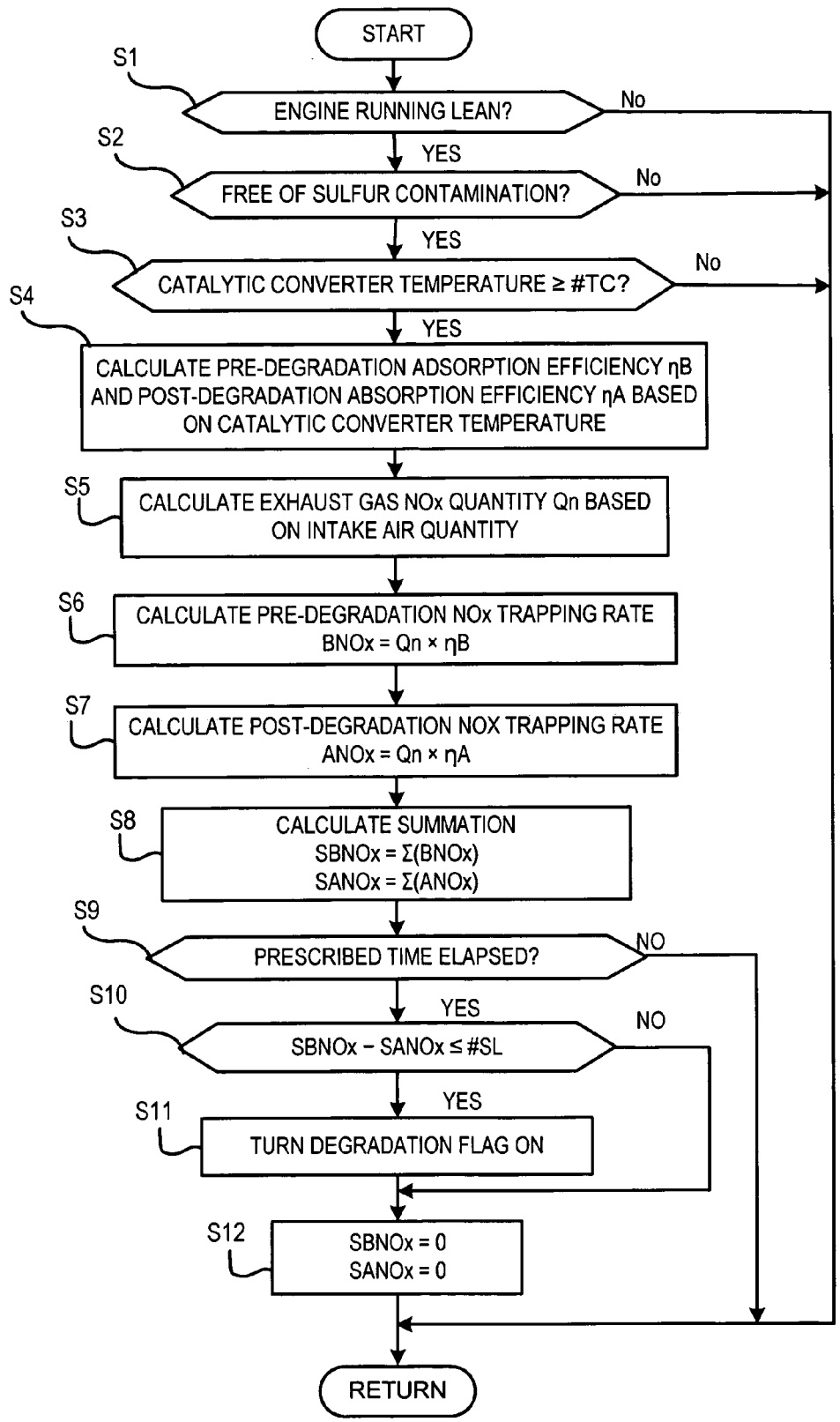
FIG. 3 is a flowchart of the control routine executed by the control unit to determine if the NOx trapping catalytic converter is degraded.

FIG. 3 is a flowchart of the control routine executed to determine if the NOx trapping catalytic converter 13 is degraded. The routine is repeatedly executed once per prescribed time period.

In step S1, the engine control unit 20 determines if the engine I is running on a lean air-fuel mixture (the normal lean air-fuel mixture of a diesel engine). If the air-fuel mixture is not lean, then the routine ends because NOx are only trapped in accordance with the characteristic curves of FIG. 2 when the air-fuel mixture is lean.

In step S2, the engine control unit 20 determines if the catalytic converter 13 is free of sulfur contamination ("sulfur poisoning"). If the catalytic converter 13 is not free of sulfur contamination, then the routine is ended because the desired NOx trapping performance cannot be obtained when the NOx trapping catalytic converter 13 is contaminated with sulfur.

The determination as to whether the catalytic converter 13 is free of sulfur contamination is accomplished by executing a separate calculation of the amount of sulfur contamination and determining if the amount of sulfur contamination is equal to or below a prescribed value. The amount of sulfur contamination is calculated, for example, by summing (integrating) the values obtained by multiplying the fuel injection quantity of the engine by a predetermined sulfur concentration (i.e., summing the increase in the amount of sulfur contamination per unit time) and subtracting the amount of sulfur contamination removed by periodically executing a sulfur contamination removal treatment in which the air-fuel ratio is changed to a rich air-fuel ratio and the fuel injection timing is retarded such that the exhaust gas temperature is increased (the amount of contamination removed being related to such factors as the amount of time over which the sulfur contamination removal treatment is executed).

In step S3, the engine control unit 20 detects the catalytic converter temperature based on the signal from the catalytic converter temperature sensor 25 and determines if the catalytic converter temperature is equal to or above a prescribed temperature #TC. If the catalytic converter temperature is not equal to or above the prescribed temperature #TC, then the routine ends because the engine 1 is considered to be insufficiently warm. The prescribed temperature #TC is an activation temperature at which the cleaning efficiency of the catalytic converter 13 is at or above a prescribed value (e.g., 90%) due to the warming up of the internal combustion engine 1. The system is configured to use the portion of the adsorption efficiency versus catalytic converter temperature characteristic shown in FIG. 2 that corresponds to the range of temperatures at which the engine can be considered to be warm.

In step S4, the engine control unit 20 uses the catalytic converter temperature Tcat detected by the catalytic converter temperature sensor 25 to find the pre-degradation adsorption efficiency $\eta B$ (adsorption efficiency corresponding to new conditions) and the post-degradation adsorption efficiency $\eta A$ (adsorption efficiency corresponding to degraded conditions) in a table expressing characteristics like those shown in FIG. 2.

In step S5, the engine control unit 20 estimates an exhaust gas NOx amount or quantity Qn in the exhaust gas based on the intake air quantity Qa detected by the air flow meter 23.

In step S6, the engine control unit 20 calculates the pre-degradation NOx trapping rate BNOx (NOx trapped per unit time at pre-degradation conditions) corresponding to pre-degradation conditions by multiplying the exhaust gas NOx quantity Qn by the pre-degradation adsorption efficiency $\eta B$, as shown in the equation below.

$$BNOx = Qn \times \eta B$$

In step S7, the engine control unit 20 calculates the post-degradation NOx trapping rate ANOx (NOx trapped per unit time at post-degradation conditions) corresponding to post-degradation conditions by multiplying the exhaust gas NOx quantity Qn by the post-degradation adsorption efficiency $\eta A$, as shown in the equation below.

$$ANOx = Qn \times \eta A$$

In step S8, the engine control unit 20 sums the pre-degradation NOx trapping rate BNOx and the post-degradation NOx trapping rate ANOx, respectively, over a prescribed amount of time to obtain a pre-degradation NOx trapping amount SBNOx and a post-degradation NOx trapping amount SANOx.

$$SBNOx = \Sigma(BNOx)$$

$$SANOx = \Sigma(ANOx)$$

In step S9, the engine control unit 20 determines if a prescribed amount of time has elapsed since it began summing the trapping rates. If not, the engine control unit 20 ends the routine.

If the prescribed amount of time has elapsed since it began summing the trapping rates, i.e., if it has calculated the pre-degradation NOx trapping amount SBNOx and the post-degradation NOx trapping amount SANOx for a prescribed time period (prescribed amount of time), then the engine control unit 20 proceeds to step S10.

In step S10, the engine control unit 20 compares the pre-degradation NOx trapping amount prediction value SBNOx and the post-degradation NOx trapping amount prediction value SANOx by finding the difference between the two values (SBNOx−SANOx) and determining if the difference is equal to or less than a prescribed value #SL.

If the difference SBNOx−SANOx is larger than the prescribed value #SL, then the temperature of the catalytic converter 13 is on the high side in FIG. 2, indicating that the heat of reaction of the oxidation reaction is large. Therefore, the engine control unit 20 determines that the NOx trapping catalytic converter 13 is normal and proceeds to step S12, where it resets the summation values SBNOx and SANOx to zero and ends the routine.

If the difference SBNOx–SANOx is equal to or smaller than the prescribed value #SL, then the temperature of the catalytic converter 13 is on the low side in FIG. 2, indicating that the heat of reaction of the oxidation reaction is small. Therefore, the engine control unit 20 determines that the NOx trapping catalyst is degraded and proceeds to step S11, where it changes the status of a degradation flag to ON. The engine control unit 20 then proceeds to step S12, where it resets the summation values SBNOx and SANOx to zero and ends the routine.

Thus, the catalytic converter temperature sensor 25 together with step S3 of FIG. 3 constitutes a temperature detecting section of the catalytic converter degradation determining system. Step S4 of FIG. 3 constitutes a pre-degradation NOx adsorption efficiency establishing section and a post-degradation NOx adsorption efficiency establishing section of the catalytic converter degradation determining system. Steps S5, S6, S8 and S9 of FIG. 3 constitute a pre-degradation trapped NOx estimating section of the catalytic converter degradation determining system. Steps S5, S7, S8 and S9 of FIG. 3 constitute a post-degradation trapped NOx estimating section of the catalytic converter degradation determining system. Steps S10 and S11 of FIG. 3 constitute a degradation determining section of the catalytic converter degradation determining system In summary, the catalytic converter degradation determining system is basically configured to do the following: detect or estimate a temperature of the catalytic converter 13; establish a NOx adsorption efficiency of the catalytic converter 13 with respect to the temperature of the catalytic converter 13 corresponding to conditions under which the catalytic converter is new; estimate an amount of trapped NOx corresponding to conditions under which the catalytic converter 13 is new based on the NOx adsorption efficiency when the catalytic converter 13 is new; establish a NOx adsorption efficiency of the catalytic converter 13 with respect to the temperature of the catalytic converter 13 corresponding to conditions under which the catalytic converter is degraded; and estimate an amount of trapped NOx corresponding to conditions under which the catalytic converter 13 is degraded based on the NOx adsorption efficiency. The catalytic converter degradation determining system then determines that the catalytic converter 13 is degraded when a comparison of the estimated value of the amount of trapped NOx corresponding to conditions under which the catalytic converter 13 is new and the estimated value of the amount of trapped NOx corresponding to conditions under which the catalytic converter 13 is degraded indicates that the difference between the two estimated values is below a prescribed value.

With this embodiment, the estimation of the NOx trapping amounts corresponding to new and degraded conditions is accomplished by establishing a NOx adsorption efficiency of the catalytic converter 13 with respect to the temperature of the catalytic converter 13 corresponding to conditions under which the catalytic converter 13 is new or degraded, calculating an amount of trapped NOx per unit time as the product of the NOx adsorption efficiency and the amount of NOx in the exhaust gas, and adding up the individual amounts of trapped NOx per unit time calculated during a prescribed amount of time. As a result, the estimation of the NOx trapping amounts corresponding to new and degraded conditions can be accomplished with improved accuracy.

This embodiment also estimates the amount of NOx contained in the exhaust gas accurately by estimating based on the intake air quantity.

Also, with this embodiment, the precision of the degradation determination can be improved because the degradation determination is executed when the amount of oxygen contained in the exhaust gas flowing into the catalytic converter 13 is excessive.

Also, with this embodiment, the precision of the degradation determination can be improved because the degradation determination is executed when the catalytic converter 13 is free of sulfur contamination ("sulfur poisoning").

Also, with this embodiment, the precision of the degradation determination can be improved because the degradation determination is executed when the temperature of the catalyst is equal to or higher than a prescribed temperature (i.e., an activation temperature at which the cleaning efficiency of the catalytic converter 13 is at or above a prescribed value due to the warming up of the internal combustion engine).

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting, estimating or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A catalytic converter degradation determining system comprising:
   a temperature detecting section configured to detect a temperature of a catalytic converter that traps NOx in exhaust gas when a lean air-fuel mixture is used for combustion and that cleans and releases trapped NOx when a stoichiometric air-fuel mixture or a rich air-fuel mixture is used for combustion;

a pre-degradation NOx adsorption efficiency establishing section configured to establish a pre-degradation NOx adsorption efficiency of the catalytic converter corresponding to conditions under which the catalytic converter is new based on the temperature of the catalytic converter;

a pre-degradation trapped NOx estimating section configured to estimate a pre-degradation NOx trapping amount using the pre-degradation NOx adsorption efficiency;

a post-degradation NOx adsorption efficiency establishing section configured to establish a post-degradation NOx adsorption efficiency of the catalytic converter corresponding to conditions under which the catalytic converter is degraded based on the temperature of the catalytic converter;

a post-degradation trapped NOx estimating section configured to estimate a post-degradation NOx trapping amount using the post-degradation NOx adsorption efficiency; and a degradation determining section configured to determine that the catalytic converter is degraded when a difference between the pre-degradation NOx trapping amount and the post-degradation NOx trapping amount is below a prescribed value, the pre-degradation trapped NOx estimating section being further configured to calculate a pre-degradation trapped NOx rate by multiplying the pre-degradation NOx adsorption efficiency by an exhaust gas NOx quantity in the exhaust gas, and to estimate the pre-degradation NOx trapping amount by summing individual values of the pre-degradation trapped NOx rate over a prescribed amount of time, and the post-degradation trapped NOx estimating section being further configured to calculate a post-degradation trapped NOx rate by multiplying the post-degradation NOx adsorption efficiency by the exhaust gas NOx quantity in the exhaust gas, and to estimate the post-degradation NOx trapping amount by summing individual values of the post-degradation trapped NOx rate over a prescribed amount of time.

2. The catalytic converter degradation determining system as recited in claim 1, wherein
the exhaust gas NOx quantity of NOx in the exhaust gas is based on an intake air quantity.

3. The catalytic converter degradation determining system as recited in claim 1, wherein
the degradation determining section is configured to be executed under conditions in which an amount of oxygen contained in exhaust gas flowing into the catalytic converter is above a prescribed amount.

4. The catalytic converter degradation determining system as recited in claim 1, wherein
the degradation determining section is configured to be executed under conditions in which the catalytic converter is free of sulfur contamination.

5. The catalytic converter degradation determining system as recited in claim 1, wherein
the degradation determining section is configured to be executed under conditions in which the temperature of the catalytic converter is equal to or higher than a prescribed temperature.

6. The catalytic converter degradation determining system as recited in claim 5, wherein
the degradation determining section is configured to set the prescribed temperature to an activation temperature at which a cleaning efficiency of the catalytic converter is at or above a prescribed value due to an engine warming up condition.

7. A catalytic converter degradation determining system comprising:

temperature detecting means for detecting a temperature of a catalytic converter that traps NOx in exhaust gas when a lean air-fuel mixture is used for combustion and that cleans and releases trapped NOx when a stoichiometric air-fuel mixture or a rich air-fuel mixture is used for combustion;

pre-degradation NOx adsorption efficiency establishing means for establishing a pre-degradation NOx adsorption efficiency of the catalytic converter corresponding to conditions under which the catalytic converter is new based on the temperature of the catalytic converter;

pre-degradation trapped NOx estimating means for estimating a pre-degradation NOx trapping amount using the pre-degradation NOx adsorption efficiency;

post-degradation NOx adsorption efficiency establishing means for establishing a post-degradation NOx adsorption efficiency of the catalytic converter corresponding to conditions under which the catalytic converter is degraded based on the temperature of the catalytic converter;

a post-degradation trapped NOx estimating means for estimating a post-degradation NOx trapping amount using the post-degradation NOx adsorption efficiency; and degradation determining means for determining that the catalytic converter is degraded when a difference between the pre-degradation NOx trapping amount and the post-degradation NOx trapping amount is below a prescribed value, the pre-degradation trapped NOx estimating means further calculating a pre-degradation trapped NOx rate by multiplying the pre-degradation NOx adsorption efficiency by an exhaust gas NOx quantity in the exhaust gas, and estimating the pre-degradation NOx trapping amount by summing individual values of the pre-degradation trapped NOx rate over a prescribed amount of time, and the post-degradation trapped NOx estimating means further calculating a post-degradation trapped NOx rate by multiplying the post-degradation NOx adsorption efficiency by the exhaust gas NOx quantity in the exhaust gas, and estimating the post-degradation NOx trapping amount by summing individual values of the post-degradation trapped NOx rate over a prescribed amount of time.

8. A method of determining degradation of a catalytic converter comprising:

detecting a temperature of a catalytic converter that traps NOx in exhaust gas when a lean air-fuel mixture is used for combustion and that cleans and releases trapped NOx when a stoichiometric air-fuel mixture or a rich air-fuel mixture is used for combustion;

establishing a pre-degradation NOx adsorption efficiency of the catalytic converter corresponding to conditions under which the catalytic converter is new based on the temperature of the catalytic converter;

estimating a pre-degradation NOx trapping amount using the pre-degradation NOx adsorption efficiency;

establishing a post-degradation NOx adsorption efficiency of the catalytic converter corresponding to conditions under which the catalytic converter is degraded based on the temperature of the catalytic converter;

estimating a post-degradation NOx trapping amount using the post-degradation NOx adsorption efficiency; and determining that the catalytic converter is degraded when a difference between the pre-degradation NOx trapping amount and the post-degradation NOx trapping amount is below a prescribed value, the estimating the pre-degradation NOx trapping amount further including calculating a pre-degradation trapped NOx rate by multiplying the pre-degradation NOx adsorption efficiency by an exhaust gas NOx quantity in the exhaust gas, and estimating the pre-degradation NOx trapping amount by summing individual values of the pre-degradation trapped NOx rate over a prescribed amount of time, and the estimating the post-degradation NOx trapping amount further including calculating a post-degradation trapped NOx rate by multiplying the post-degradation NOx adsorption efficiency by the exhaust gas NOx quantity in the exhaust gas, and estimating the post-degradation NOx trapping amount by summing individual values of the post-degradation trapped NOx rate over a prescribed amount of time.

* * * * *